United States Patent
Sarraillon et al.

(10) Patent No.: US 6,984,949 B2
(45) Date of Patent: Jan. 10, 2006

(54) SYSTEM AND METHOD TO SELECTIVELY PREVENT MOVEMENTS OF AN ELECTRIC VEHICLE

(75) Inventors: Serge Sarraillon, Varennes (CA); Philippe Noël, Beloeil (CA)

(73) Assignee: TM4 Inc., Boucherville (CA)

( * ) Notice: Subject to any disclaimer, the term of this patent is extended or adjusted under 35 U.S.C. 154(b) by 0 days.

(21) Appl. No.: 10/453,145

(22) Filed: Jun. 2, 2003

(65) Prior Publication Data

US 2004/0239270 A1 Dec. 2, 2004

(51) Int. Cl.
*H02K 23/68* (2006.01)

(52) U.S. Cl. .................... 318/432; 318/434; 323/274; 323/275; 323/284

(58) Field of Classification Search ............... 318/432, 318/434; 323/274, 275, 284
See application file for complete search history.

(56) References Cited

U.S. PATENT DOCUMENTS

| | | | | |
|---|---|---|---|---|
| 4,146,108 A | * | 3/1979 | Sato | 180/271 |
| 4,349,809 A | * | 9/1982 | Tomes | 340/440 |
| 4,648,289 A | * | 3/1987 | Kubo et al. | 477/93 |
| 4,717,207 A | * | 1/1988 | Kubota et al. | 303/3 |
| 5,376,869 A | * | 12/1994 | Konrad | 318/587 |
| 5,484,044 A | * | 1/1996 | Bursteinas et al. | 188/353 |
| 5,568,024 A | | 10/1996 | Suzuki | 138/139 |
| 6,056,373 A | * | 5/2000 | Zechmann et al. | 303/191 |
| 6,260,934 B1 | * | 7/2001 | Lee | 303/192 |
| 6,270,171 B1 | * | 8/2001 | Krieg et al. | 303/125 |
| 6,270,172 B1 | * | 8/2001 | Shirai et al. | 303/152 |
| 6,293,366 B1 | * | 9/2001 | Chabaan et al. | 180/446 |
| 6,296,326 B1 | * | 10/2001 | Steiner et al. | 303/125 |
| 6,554,744 B2 | * | 4/2003 | Schmidt | 477/208 |
| 2002/0021106 A1 | | 2/2002 | Okamura et al. | |

FOREIGN PATENT DOCUMENTS

| | | |
|---|---|---|
| DE | 198 38 970 A1 | 3/2000 |
| DE | 101 33 228 A1 | 3/2002 |
| WO | WO 93/04888 A1 | 3/1993 |

* cited by examiner

*Primary Examiner*—Rita Leykin
(74) *Attorney, Agent, or Firm*—Lorusso & Loud

(57) ABSTRACT

A method and system for preventing the movements of an electric vehicle in a direction opposite a desired direction are described herein. The electric vehicle comprises an electric motor linked to at least one wheel of the vehicle. The method comprises detecting the direction of the desired movement; detecting a movement of the vehicle in the direction opposite the desired direction; calculating a torque to be applied by the motor to the at least one wheel to counteract the movement of the vehicle in the undesired direction; and applying the counteracting torque to the at least one wheel via the electric motor.

23 Claims, 5 Drawing Sheets

FIG_1

FIG_2

SYSTEM AND METHOD TO SELECTIVELY PREVENT MOVEMENTS OF AN ELECTRIC VEHICLE

FIELD OF THE INVENTION

The present invention relates to electric vehicles. More specifically, the present invention is concerned with a system and method to selectively prevent movements in a direction opposite to the direction intended by the user.

BACKGROUND OF THE INVENTION

Electric vehicles are well known in the art. They may be of the purely electric or of the hybrid types. They include an electric motor that is mechanically coupled to one or more wheels to selectively force the rotation of the wheel according to commands given by the user.

Many challenges await the electric vehicle industry. Indeed, the driver of conventional combustion engine equipped vehicles has become accustomed to many features thereof that are now part of the "normal driving feelings".

OBJECTS OF THE INVENTION

An object of the present invention is therefore to provide a system and method to selectively prevent movements of an electric vehicle.

SUMMARY OF THE INVENTION

More specifically, in accordance with the present invention, there is provided a system for preventing the movements of an electric vehicle in a direction opposite a desired direction comprising:

a controller;

an electric motor connected to and controlled by the controller; the electric motor being linked to at least one wheel of the vehicle;

a sensor associated with the motor to detect rotation thereof; the sensor being connected to the controller to supply angle position data thereto; the sensor being so configured as to detect rotation of the electric motor in the direction opposite the desired direction and supply this data to the controller that, in turn, calculates a torque to be applied by the motor to counteract the undesired rotation of the motor and controls the motor so that this torque is applied.

According to another aspect of the present invention there is provided a system for preventing the movements of an electric vehicle in a direction opposite a desired direction comprising:

a controller;

an electric motor connected to and controlled by the controller; the electric motor being linked to at least one wheel of the vehicle;

a sensor associated with the vehicle to detect a movement in an undesired direction; the sensor being connected to the controller to supply movement data thereto;

the controller being so configured that upon receipt of data from the sensor that the vehicle is moving in the undesired direction, the controller calculates a torque to be applied to the at least one wheel by the motor to counteract the undesired rotation of the motor and controls the motor so that this torque is applied.

According to a third aspect of the present invention there is provided a method for preventing the movements of an electric vehicle in a direction opposite a desired direction; the electric vehicle comprising an electric motor linked to at least one wheel of the vehicle; the method comprising the acts of:

detecting the direction of the desired movement;

detecting a movement of the vehicle in a direction opposite the desired direction;

calculating a torque to be applied by the motor to the at least one wheel to counteract the movement of the vehicle in the undesired direction;

applying the counteracting torque to the at least one wheel via the electric motor.

According to another aspect of the present invention there is provided a method for preventing the movements of an electric vehicle in a direction opposite a desired direction; the electric vehicle comprising an electric motor linked to at least one wheel of the vehicle; the method comprising the acts of:

detecting the direction of the desired movement;

detecting a rotation of the electric motor in a direction opposite the desired direction;

calculating a torque to be applied by the motor to the at least one wheel to counteract the rotation of the motor in the undesired direction;

applying the counteracting torque to the electric motor. It is to be noted that the expression "electric vehicle" is to be construed as encompassing pure electric vehicles, any type of hybrid vehicles where at least one of the wheels is directly or indirectly connected to an electric motor, and the like.

Other objects, advantages and features of the present invention will become more apparent upon reading of the following non-restrictive description of preferred embodiments thereof, given by way of example only with reference to the accompanying drawings.

DETAILED DESCRIPTION

In a nutshell, the present invention concerns a hill holder that detects movements of the vehicle of the vehicle in an undesired direction and energizes the motor(s) of the vehicle to counteract this unwanted movement. More specifically, when the vehicle is intended to go forward, the backward movements of the vehicle is detected and the motor(s) is so controlled as to prevent this movement. Similarly, when the vehicle is intended to back-up, forward movements is detected and counteracted.

Figure 1:
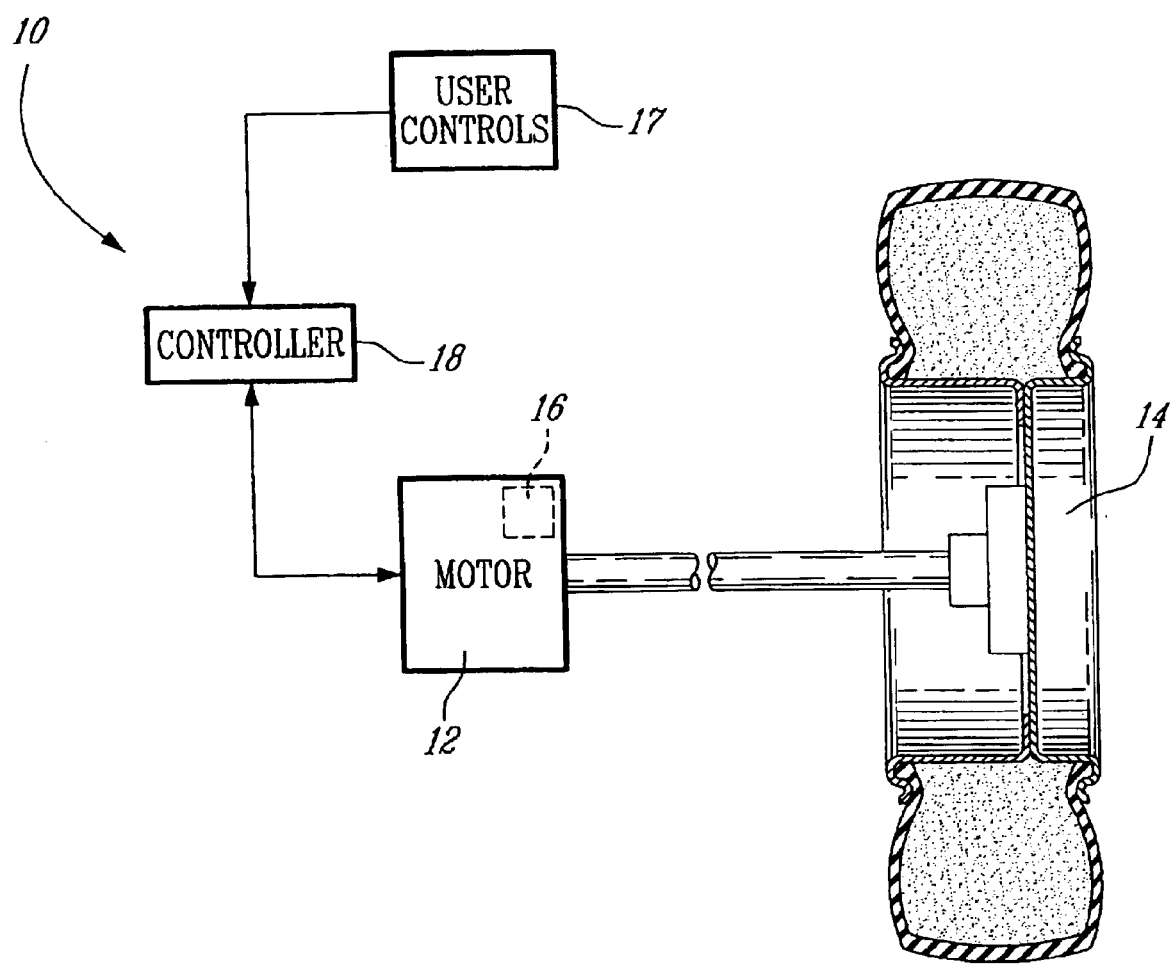
FIG. 1 is a block diagram of a system according to a first embodiment of the present invention.

Turning now to FIG. 1 of the appended drawings a system 10 according to a first embodiment of the present invention will be described. It is to be noted that the system 10 is schematically illustrated for clarity purposes.

The system 10 includes an electric motor 12 linked to a wheel 14; a sensor 16, incorporated in the motor 12, to detect the rotation of the drive shaft of the motor 12, user controls 17 including a desired direction input device, and a controller 18 linked to the motor 12, to the sensor 16 and to the user controls 17 so as to, among others, control the motor according to the data supplied by the sensor 16 as will be described hereinbelow.

Figure 2:
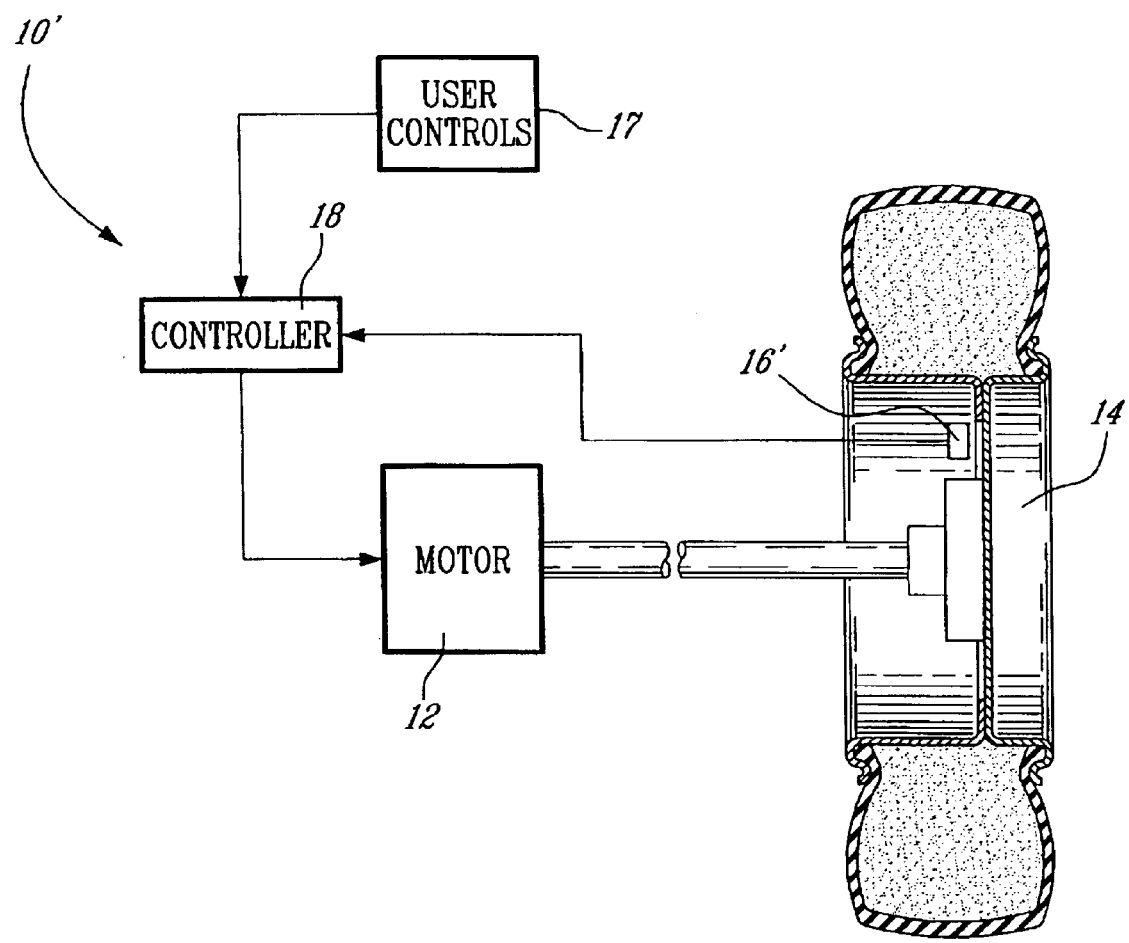
FIG. 2 is a block diagram of a system according to a second embodiment of the present invention.

Turning now briefly to FIG. 2 of the appended drawings, a system 10' according to a second embodiment of the present invention will be described. The system 10' is very similar to the system 10 of FIG. 1. The main difference between these systems is the location of the sensor 16' that is linked with the wheel 14 instead of being incorporated in the motor 12.

It is to be noted that many different technologies could be used to design the sensors 16 and 16'. Furthermore, the controller 18 could be a dedicated controller or could be part of the main controller of the vehicle.

A method to selectively prevent movements of an electric vehicle according to an embodiment of the present invention will now be described with reference to FIGS. 3 to 6.

Generally stated the method described hereinbelow aims at applying a counteracting torque to at least one wheel of the vehicle when a movement of the vehicle in a direction opposite the desired direction is detected. The torque applied (T) increases with the angle difference between the instantaneous angle sensed ($\theta$) and the reference angle ($\theta_{init}$) until it reaches the maximal holding torque ($T_{max}$) of the motor. At that time the reference angle is recalculated to prevent undesired oscillations as will be described hereinbelow.

Figure 3:
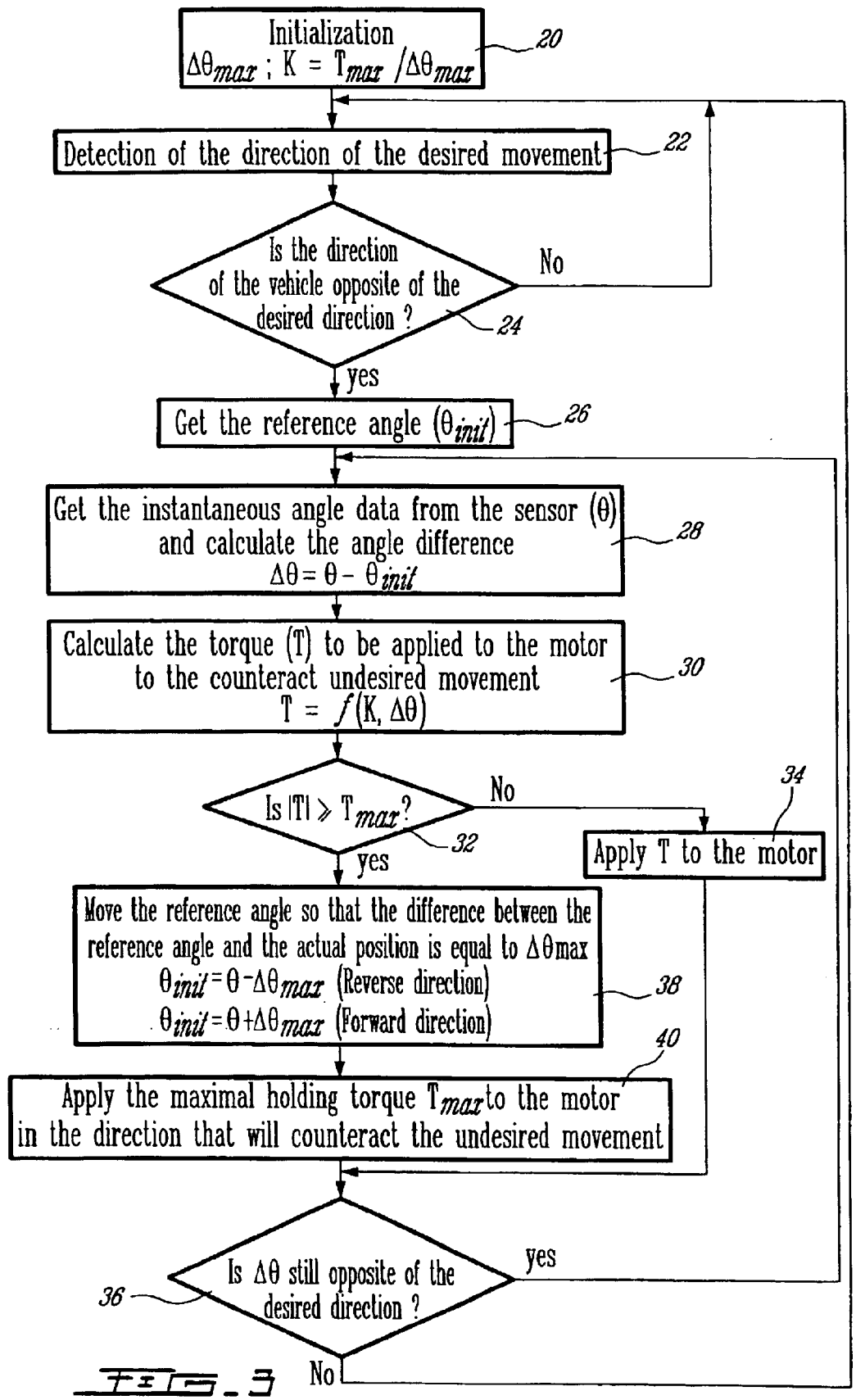
FIG. 3 is a flowchart illustrating a method according to an embodiment of the present invention.

Turning now more specifically to FIG. 3 of the appended drawings, the various steps according to an embodiment of the method of the present invention will be described.

Step 20 is an initialization step. Two main parameters are initialized in this step. First, the constant $\Delta\theta_{max}$ representing the maximal angle that is allowed before the torque reaches $T_{max}$ is set. The constant K is calculated by dividing $T_{max}$ by $\Delta\theta_{max}$ and will be used as a scaling constant to help determine the increase of the torque applied to the motor with respect to the instantaneous angle measured.

The second step 22 is the determination of the desired direction of the vehicle. This is done via the transmission controls that are part of the user controls 17. The transmission controls are either in a park, forward, neutral or reverse position.

Of course, other methods could be used to determine the desired direction of the vehicle such as, for example, by an algorithm that analyzes past displacements of the vehicle in such way it knows the vehicle desired direction.

It is to be noted that the park position dictates to the present method that no movement is desired. However, a conventional mechanical mechanism (not shown) is usually provided on vehicles and engaged when the transmission is placed in the park position. Optionally, the method of the present invention could be designed to detect any movements of the vehicle when it is in the park position and counteract this eventual movements, thereby improving safety, should the mechanical mechanism fail.

Alternatively, when the transmission is in the park position, the method and system of the present invention could sense any movement and apply a counteracting torque. It is to be noted that the same rules regarding the maximal torque to be applied to the motor applies. A mechanical brake (not shown) would be automatically applied should the maximal holding torque be reached.

On the contrary, when the transmission is in its neutral position, the system and method described herein is not activated since the vehicle should be allowed to move freely.

Step 24 determines if the direction of the vehicle is opposite the desired direction. This is done by sensing the direction of rotation (if any) of the wheel via an internal or external sensor.

Should step 24 be negative the method returns to step 22.

Figure 4:
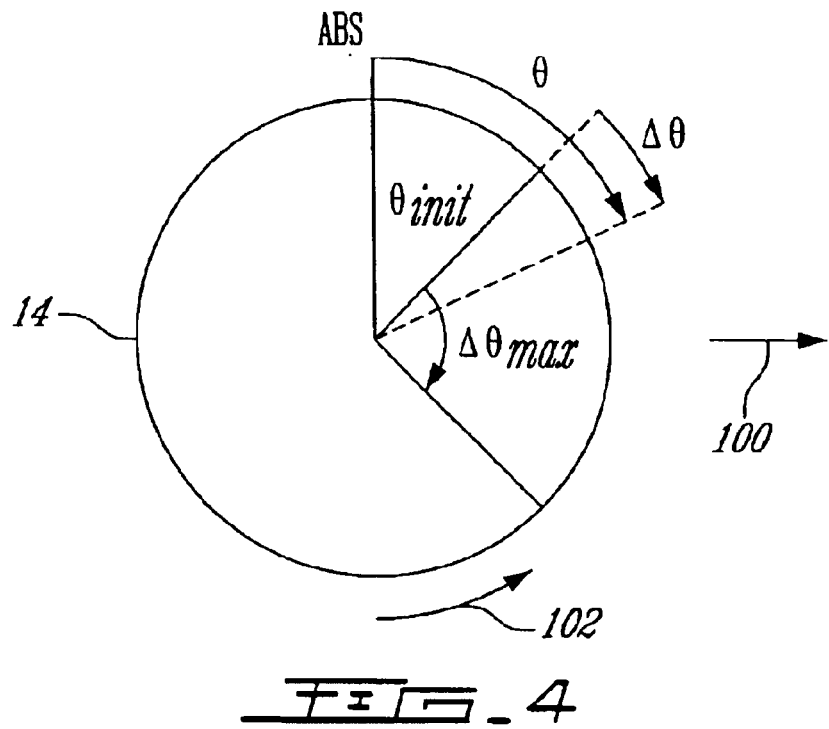
FIG. 4 is a schematic representation of a wheel of a vehicle illustrating the various angles referred to in FIG. 3.
Figure 5:
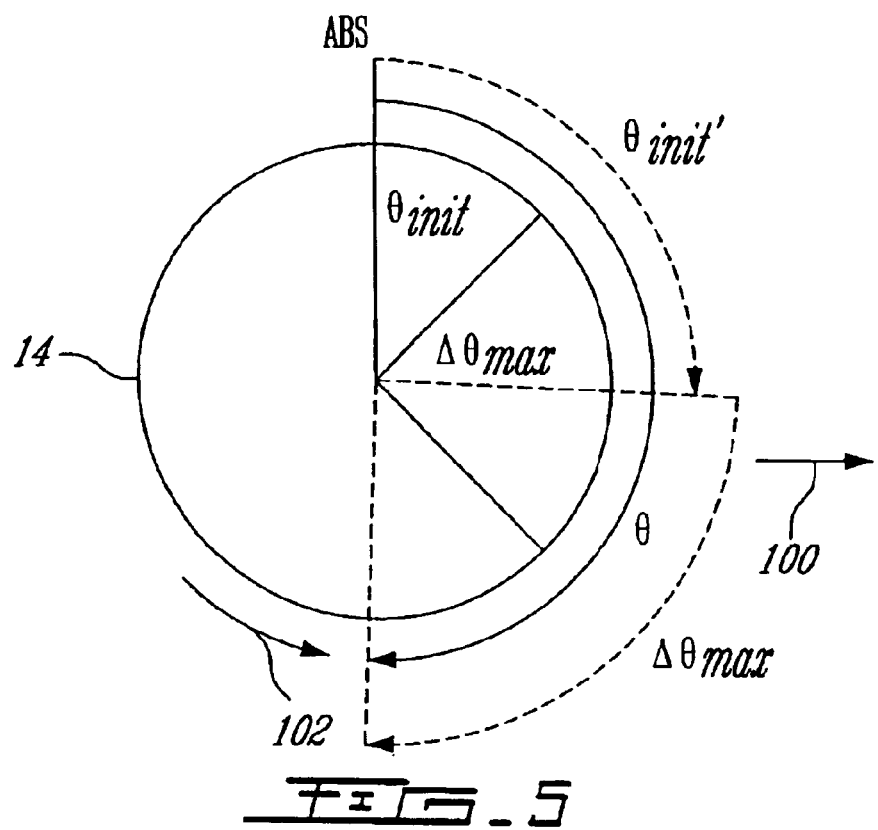
FIG. 5 is a schematic view similar to FIG. 4.
Figure 6:
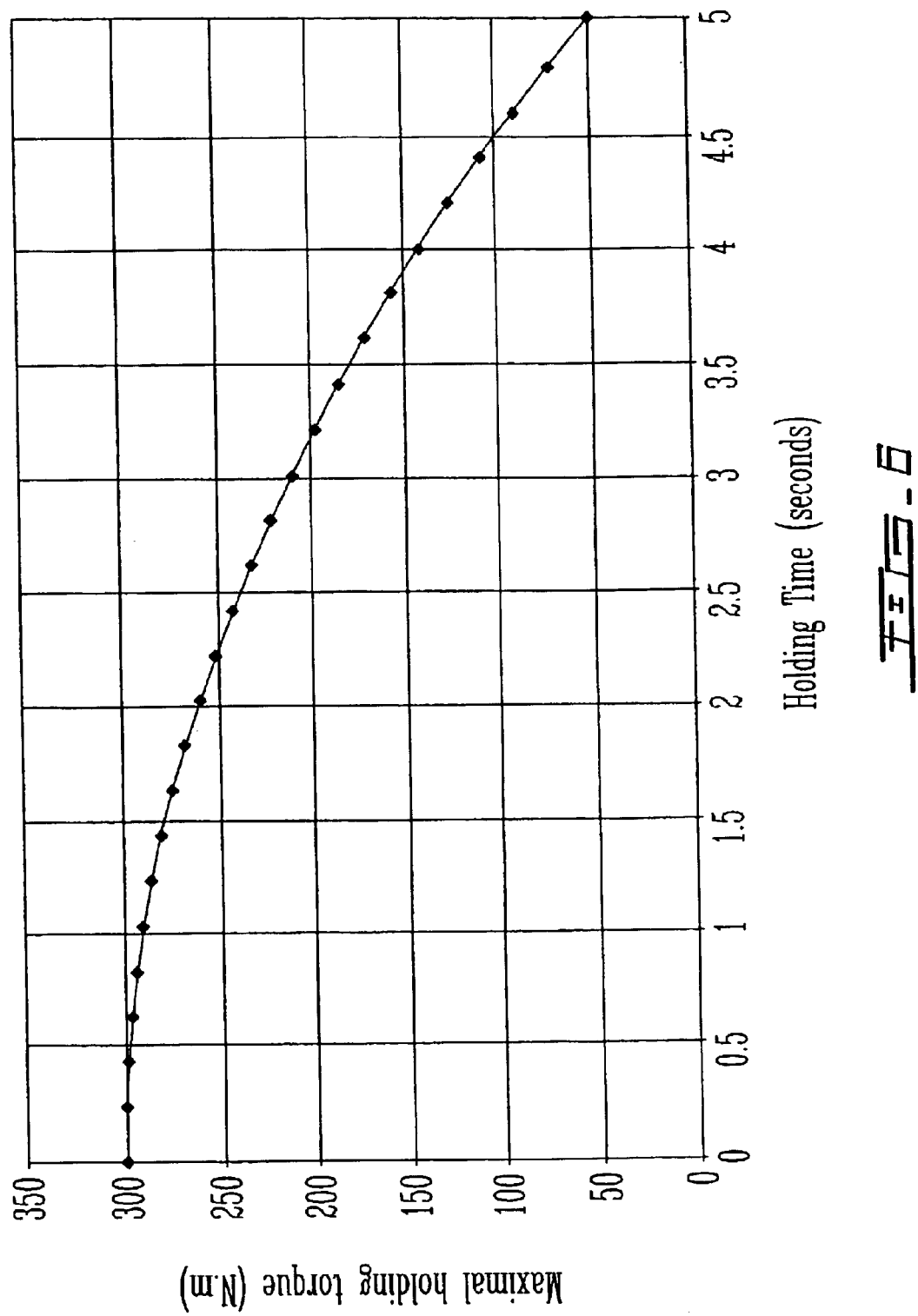
FIG. 6 is a graph showing how the maximal holding torque may vary in time.

If the direction of the movement is indeed opposite to the desired direction, the reference angle $\theta_{init}$ is acquired from the sensor (step 26). FIG. 4 shows $\theta_{init}$ with respect to the reference angle of the sensor (ABS). In FIG. 4, the desired direction of the vehicle is illustrated by arrow 100. Therefore, rotation of the wheel 14 in the direction of arrow 102 indicates that there is movement in the undesired direction, therefore prompting the acquisition of the reference angle $\theta_{init}$.

The next steps aim at determining and applying the appropriate torque T to the motor to counteract the movement detected in the undesired direction.

In step 28, once the reference angle $\theta_{init}$ is acquired, the sensor acquires the instantaneous angle data ($\theta$) from the sensor to determine the present angular position of the wheel with respect to the $\theta_{init}$ and to calculate $\Delta\theta$ according to the equation $\Delta\theta=\theta-\theta_{init}$. FIG. 4 illustrates the instantaneous angle $\theta$ and the angle difference $\Delta\theta$.

The next step 30 is to calculate the torque T to be applied to the motor to oppose the movement in the undesired direction. Many approaches may be taken to determine the torque T.

These approaches may be summarized by making T a function of the constant K and the angle difference $\Delta\theta$. Therefore:

$$T=f(K,\Delta\theta)$$

A simple function would be $T=K*\Delta\theta$. The torque T to be applied to the motor would therefore increases linearly with the increase of $\Delta\theta$.

As mentioned hereinabove, in the initialization step 20, the constant K is calculated and stored. As will be understood by one skilled in the art, the constant K is calculated so that when $\Delta\theta$ equals $\Delta\theta_{max}$ the torque T equals the maximal holding torque $T_{max}$ of the motor when the simple function discussed hereinabove is used.

Before applying the torque T to the motor, step 32 verifies that the torque T, in absolute value, does not exceed the maximal holding torque $T_{max}$. In other words, it can also be viewed as the verification that $\Delta\theta$, in absolute value, does not exceed $\Delta\theta_{max}$.

If the verification of step 32 is negative, the torque T is applied to the motor in step 34.

Step 36 then determines if $\Delta\theta$ is still opposite the desired direction. If so, the method loops to step 28 to recalculate $\Delta\theta$ and thus increases the torque T. If not, the method loops to step 22.

If the verification of step 32 is positive, it means that the torque applied to the motor has reached the maximal holding torque $T_{max}$ without adequately counteracting the movement of the vehicle in the undesired direction.

To slow down the movement of the vehicle in the direction opposite the desired direction, the maximal holding torque is applied to the motor in step 40. Concurrently, in step 38, the reference angle $\theta_{init}$ is moved (see $\theta_{init}'$ in FIG. 5) so that the difference between the instantaneous angle data $\theta$ and the new $\theta_{init}'$ remains $\Delta\theta_{max}$. In other words, the reference angle is moved so as to maintain the calculated torque equal to the maximal holding torque of the motor. Of course, the calculation is different is the vehicle transmission is in a forward or reverse position.

As will be understood by one skilled in the art, since it is clear that the movement of the vehicle in the direction opposite the desired direction may not be counteracted in the initial $\Delta\theta_{max}$ region, this region is moved to prevent unwanted oscillations of the vehicle. Indeed, it would be unadvisable to try to force the vehicle back to the initial reference angle position $\theta_{init}$.

The maximal holding torque $T_{max}$ discussed hereinabove could be set to a constant value, such as the nominal torque of the motor, for example. But $T_{max}$ also could be set to a variable value that decreases in time from maximal torque of the motor to zero shown in FIG. 6. This decrease of the $T_{max}$ value is interesting since it requires the driver to keep a foot on the brake when the vehicle is stopped in gear, which prevents the driver from leaving the vehicle without previously putting the transmission in the park position.

It is to be understood that the above method has been simplified for concision purpose and that many other steps could be added. For example, should the user change the desired direction via the user controls 17 while the vehicle is moving, the method described above would wait for the vehicle to come to a stop before being activated in the new desired direction.

The skilled artisan in the art will also understand that the torque applied to the wheels does not stop abruptly once the user of the vehicle starts to depress the acceleration pedal. Indeed, the torque applied remains the same until the command supplied via the acceleration pedal requires a torque greater than the torque applied by the method described hereinabove. A smooth transition is therefore obtained.

One skilled in the art will understand that even though the system of FIGS. 1 and 2 and the method of FIG. 3 indicate that either the rotational movement of the motor or of one wheel is detected and/or measured, undesired movements of the entire vehicle could also be directly detected or measured using various schemes.

Although the present invention has been described hereinabove by way of preferred embodiments thereof, it can be modified, without departing from the spirit and nature of the subject invention as defined in the appended claims.

What is claimed is:

1. A system for preventing the movements of an electric vehicle in a direction opposite a desired direction comprising:
   a controller;
   an electric motor connected to and controlled by said controller; said electric motor being linked to at least one wheel of the vehicle;
   a sensor associated with said motor to detect rotation thereof; said sensor being connected to said controller to supply angle position data thereto; said sensor being so configured as to detect rotation of said electric motor in the direction opposite the desired direction and supply this data to said controller that, in turn, calculates a torque to be applied by said motor to counteract the undesired rotation of said motor and controls said motor so that this torque is applied; said torque calculation being a function of an angle formed between a reference angle position and an instantaneous angle position supplied by said sensor.

2. The movement preventing system of claim 1, wherein said sensor is integrated with said electric motor to continuously supply angle position data to said controller.

3. The movement preventing system of claim 1, wherein said sensor is so mounted to said vehicle as to detect rotation of at least one wheel thereof.

4. The movement preventing system of claim 1, wherein said controller is so configured so that the counteracting torque supplied to said motor is not greater than a predetermined maximal holding torque of said motor.

5. The movement preventing system of claim 4, wherein said predetermined maximal holding torque is constant and equals the nominal torque of said motor.

6. The movement preventing system of claim 4, wherein said predetermined maximal holding torque varies depending on the length of time the system is in use.

7. The movement preventing system of claim 1, wherein the desired direction is determined via a user control.

8. The movement preventing system of claim 1, wherein the desired direction is determined via an analysis of past displacements of the vehicle.

9. A system for preventing the movements of an electric vehicle in a direction opposite a desired direction comprising:
   a controller;
   an electric motor connected to and controlled by said controller; said electric motor being linked to at least one wheel of the vehicle;
   a sensor associated with said vehicle to detect a movement in an undesired direction; said sensor being connected to said controller to supply movement data thereto;
   said controller being so configured that upon receipt of data from said sensor that the vehicle is moving in said undesired direction, said controller calculates a torque to be applied to said at least one wheel by said motor to counteract the undesired rotation of said motor and controls said motor so that this torque is applied; said torque calculation being a function of an angle formed between a reference angle position and an instantaneous angle position supplied by said sensor.

10. The movement preventing system of claim 9, wherein said controller is so configured so that the counteracting torque supplied to said motor is not greater than a maximal holding torque of said motor.

11. A method for preventing the movements of an electric vehicle in a direction opposite a desired direction; said electric vehicle comprising an electric motor linked to at least one wheel of the vehicle; said method comprising the acts of:
   detecting the direction of the desired movement;
   detecting a movement of the vehicle in a direction opposite the desired direction;
   calculating a torque to be applied by the motor to the at least one wheel to counteract the movement of the vehicle in the undesired direction; said torque calculation being a function of an angle formed between a reference angle position and an instantaneous angle position supplied by said sensor;
   applying the counteracting torque to the at least one wheel via the electric motor.

12. The movement preventing method of claim 11, wherein said direction detecting act includes:
   providing a user controlled direction input device;
   providing a controller;
   detecting a state of the input device; and
   supplying the detected state to the controller.

13. The movement preventing method of claim 12, wherein said movement detecting act includes:

providing a movement sensor connected to the controller; and supplying sensor data to the controller.

14. The movement preventing method of claim 11, wherein said movement sensor providing act includes providing an angle position sensor associated with the motor; said sensor data supplying act including supplying angle position data to the controller.

15. The movement preventing method of claim 11, wherein said torque calculating act includes:

determining a reference angle position when a movement of the vehicle in the direction opposite the desired direction is detected;

determining an instantaneous angle position data; and calculating a torque to be applied as a function of the difference between the instantaneous angle position data and the reference angle position.

16. The movement preventing method of claim 15, wherein said counteracting torque applying act includes:

applying the calculated counteracting torque when the calculated counteracting torque is less than a maximal holding torque of the electric motor; and applying the maximal holding torque of the motor when the calculated counteracting torque is greater than a maximal holding torque of the electric motor.

17. The movement preventing method of claim 16, wherein said reference angle is moved when said calculated counteracting torque is greater than the maximal holding torque of the electric motor so as to maintain the calculated torque equal to the maximal holding torque of the motor.

18. A method for preventing the movements of an electric vehicle in a direction opposite a desired direction; said electric vehicle comprising an electric motor linked to at least one wheel of the vehicle; said method comprising the acts of:

detecting the direction of the desired movement;

detecting a rotation of the electric motor in a direction opposite the desired direction;

calculating a torque to be applied by the motor to the at least one wheel to counteract the rotation of the motor in the undesired direction; said torque calculation being a function of an angle formed between a reference angle position and an instantaneous angle position supplied by said sensor;

applying the counteracting torque to the electric motor.

19. The movement preventing method of claim 18, wherein said direction detecting act includes:

providing a user controlled direction input device;

providing a controller;

detecting a state of the input device; and supplying the detected state to the controller.

20. The movement preventing method of claim 19, wherein said rotation detecting act includes:

providing an angle position sensor associated with the motor; and supplying angle position data to the controller.

21. The movement preventing method of claim 20, wherein said torque calculating act includes:

determining a reference angle position when a rotation of the electric motor in the direction opposite the desired direction is detected;

determining an instantaneous angle position data; and calculating a torque to be applied as a function of the difference between the instantaneous angle position data and the reference angle position.

22. The movement preventing method of claim 21, wherein said counteracting torque applying act includes:

applying the calculated counteracting torque when the calculated counteracting torque is less than a maximal holding torque of the electric motor; and applying the maximal holding torque of the motor when the calculated counteracting torque is greater than a maximal holding torque of the electric motor.

23. The movement preventing method of claim 19, wherein said reference angle is moved when said calculated counteracting torque is greater than the maximal holding torque of the electric motor so as to maintain the calculated torque equal to the maximal holding torque of the motor.

* * * * *